(12) United States Patent
Ripp et al.

(10) Patent No.: US 11,370,012 B2
(45) Date of Patent: Jun. 28, 2022

(54) MODIFIABLE GOLF CLUB HEAD

(71) Applicant: Sumitomo Rubber Industries, Ltd., Kobe (JP)

(72) Inventors: Patrick Ripp, Huntington Beach, CA (US); Keith Dolezel, Franklin, NY (US)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 17/353,670

(22) Filed: Jun. 21, 2021

(65) Prior Publication Data

US 2021/0308734 A1 Oct. 7, 2021

Related U.S. Application Data

(62) Division of application No. 16/392,021, filed on Apr. 23, 2019, now Pat. No. 11,065,661.

(51) Int. Cl.
*B21D 11/10* (2006.01)
*A63B 53/06* (2015.01)
*A63B 53/04* (2015.01)
*A63B 53/08* (2015.01)
*A63B 102/32* (2015.01)

(52) U.S. Cl.
CPC ............ *B21D 11/10* (2013.01); *A63B 53/047* (2013.01); *A63B 53/06* (2013.01); *A63B 53/08* (2013.01); *A63B 2102/32* (2015.10)

(58) Field of Classification Search
CPC ....... B21D 11/10; A63B 53/06; A63B 53/047; A63B 53/08; A63B 2102/32
USPC .................................. 473/324–350, 287–292
See application file for complete search history.

(56) References Cited

U.S. PATENT DOCUMENTS

| | | | | |
|---|---|---|---|---|
| 1,695,598 A | * | 12/1928 | MacClain | A63B 53/047 473/328 |
| 1,975,822 A | * | 10/1934 | Young | A63B 60/00 473/328 |
| 2,478,468 A | * | 8/1949 | Drake | A63B 53/0487 473/313 |
| 2,838,312 A | * | 6/1958 | Drake | A63B 53/02 473/332 |
| 3,079,157 A | * | 2/1963 | Turner | A63B 53/047 473/328 |
| D203,936 S | | 3/1966 | Long | |
| D215,608 S | | 10/1969 | Lysaght | |
| 3,621,700 A | | 11/1971 | Watchtell et al. | |

(Continued)

FOREIGN PATENT DOCUMENTS

CN 109226343 A 1/2019

OTHER PUBLICATIONS

My Golf Spy Forum—http: //forum.mygolfspy.com/topic/2410-wedge-grinding-torching/ (Year: 2010).

*Primary Examiner* — Sebastiano Passaniti
(74) *Attorney, Agent, or Firm* — Barry IP Law, P.C.

(57) ABSTRACT

A golf club head includes a striking face including a face center, a top portion, a sole including a leading edge and a trailing edge, and a rear side opposite the striking face. The rear side includes a channel configured to permit bending at least a portion of the sole to cause plastic deformation to change a bounce angle defined as an angle between a virtual sole line and a virtual ground plane when the golf club head is orientated in a reference position where the golf club head is addressed to hit a golf ball.

15 Claims, 9 Drawing Sheets

(56) References Cited

U.S. PATENT DOCUMENTS

| | | | | |
|---|---|---|---|---|
| 3,862,759 A * | 1/1975 | Evans | A63B 60/00 | |
| | | | 473/328 | |
| 3,997,171 A * | 12/1976 | Currie | A63B 53/04 | |
| | | | 473/324 | |
| 4,058,880 A | 11/1977 | Hughley | | |
| 4,620,431 A * | 11/1986 | Muldoon | B21D 3/14 | |
| | | | 72/31.02 | |
| 4,741,371 A | 5/1988 | Lord | | |
| 5,154,781 A * | 10/1992 | Catellier | C21D 6/004 | |
| | | | 148/542 | |
| 5,593,356 A * | 1/1997 | Takeda | A63B 60/00 | |
| | | | 473/335 | |
| 5,800,281 A * | 9/1998 | Gilbert | A63B 53/047 | |
| | | | 473/287 | |
| D468,788 S | 1/2003 | Bode et al. | | |
| D503,201 S | 3/2005 | Wood et al. | | |
| D503,202 S | 3/2005 | Wood et al. | | |
| D503,203 S | 3/2005 | Wood et al. | | |
| 7,758,440 B2 * | 7/2010 | Llewellyn | A63B 53/06 | |
| | | | 473/244 | |
| 7,988,564 B2 * | 8/2011 | Jertson | A63B 53/047 | |
| | | | 473/290 | |
| 8,007,373 B2 * | 8/2011 | Soracco | B22F 10/20 | |
| | | | 473/349 | |
| 8,795,102 B2 * | 8/2014 | Knight | A63B 53/047 | |
| | | | 473/350 | |
| 8,821,307 B2 | 9/2014 | Park et al. | | |
| 9,227,117 B2 | 1/2016 | Kim et al. | | |
| D779,007 S * | 2/2017 | Oyler | D21/747 | |
| 9,669,272 B2 | 6/2017 | Park et al. | | |
| 10,080,931 B2 * | 9/2018 | Brunski | A63B 53/0466 | |
| 10,143,900 B2 * | 12/2018 | Harrington | A63B 53/047 | |
| D846,049 S | 4/2019 | Becktor | | |
| D846,052 S | 4/2019 | Becktor | | |
| D860,364 S | 9/2019 | Seagram et al. | | |
| D911,473 S | 2/2021 | Ripp et al. | | |
| 11,065,661 B2 * | 7/2021 | Ripp | A63B 53/08 | |
| 2004/0147335 A1 * | 7/2004 | Iwata | A63B 53/04 | |
| | | | 473/291 | |
| 2004/0266545 A1 * | 12/2004 | Gilbert | A63B 53/047 | |
| | | | 473/291 | |
| 2009/0186717 A1 * | 7/2009 | Stites | A63B 60/02 | |
| | | | 473/291 | |
| 2009/0239682 A1 * | 9/2009 | Roberts | A63B 53/047 | |
| | | | 473/350 | |
| 2018/0056617 A1 | 3/2018 | Chan et al. | | |

* cited by examiner

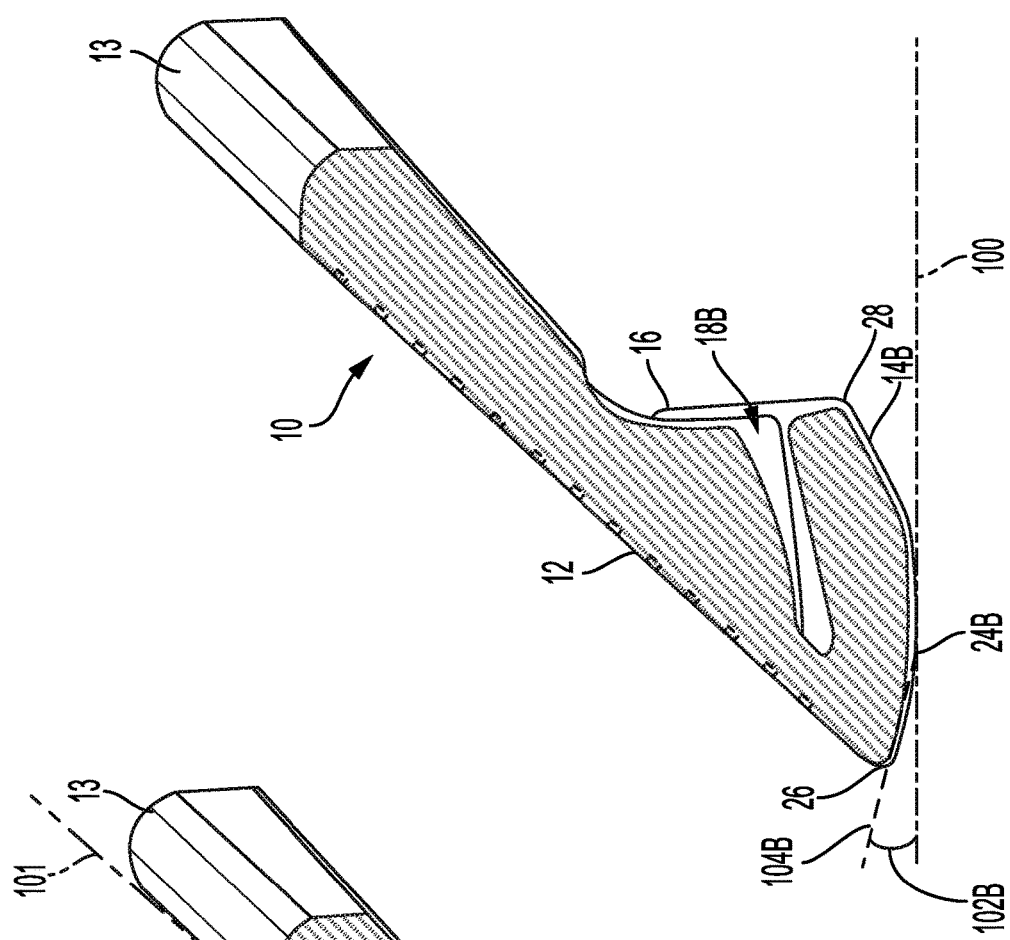
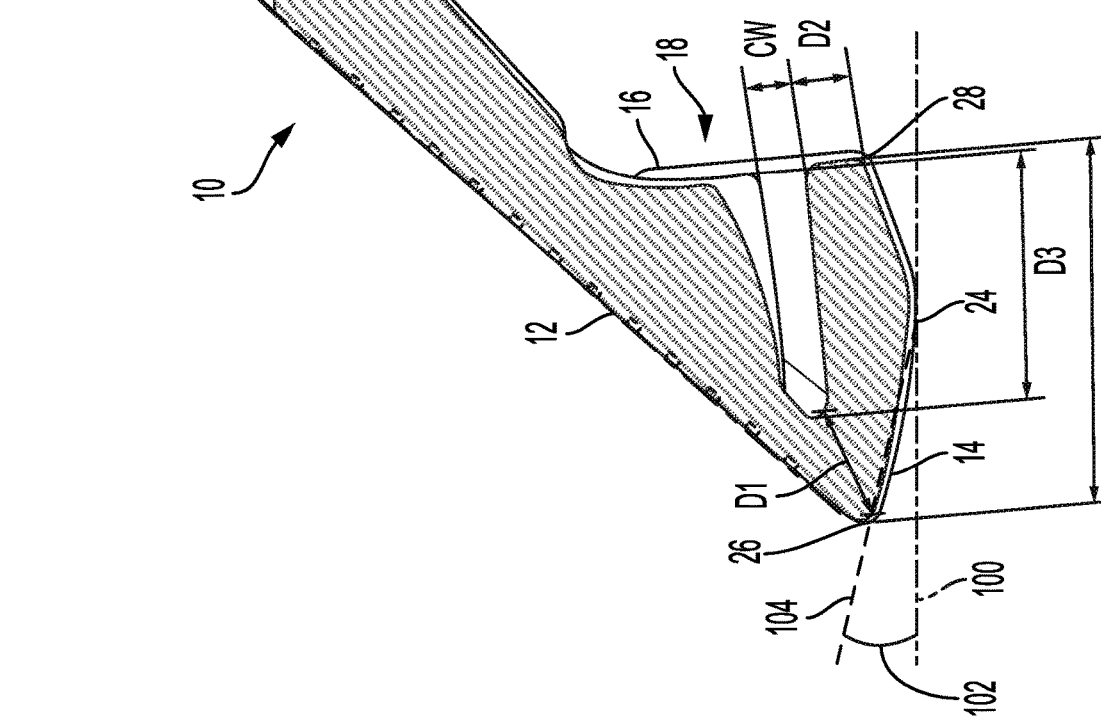

MODIFIABLE GOLF CLUB HEAD

CROSS-REFERENCE TO RELATED APPLICATION

This application is a divisional of application Ser. No. 16/392,021, filed on Apr. 23, 2019, titled "MODIFIABLE GOLF CLUB HEAD", the contents of which are hereby incorporated by reference in their entirety.

BACKGROUND

A bounce or bounce angle of a golf club head can be generally thought of as how much lower a trailing portion of a sole of the golf club head is than a leading edge of the sole, i.e., the degree to which the sole is inclined relative to a virtual ground plane. The bounce angle ordinarily affects the amount of resistance the golf club head encounters from turf, soil, or sand when swinging the golf club to hit a golf ball. The bounce angle may in part preferably match the characteristics of a particular player. However, more relevantly, bounce angle can be especially important with regard to particular turf conditions, for example, when the golf ball is hit from looser ground surfaces, such as from soft sand or tall grass, to allow the golf club head to move with less resistance through the grass or sand.

Different golf club heads, such as pitching wedges and sand wedges, can have different bounce angles for different ground surface conditions. In addition, players may benefit from different bounce angles depending on, for example, the angle of attack or steepness of their swing toward the golf ball. For example, players with a shallow angle of attack in their swing may benefit from a lower bounce angle where the trailing portion of the sole is not much lower than a leading edge of the sole, while players with a steeper angle of attack in their swing may benefit from a higher bounce angle where the trailing portion of the sole is relatively lower.

The sole of a golf club head may be ground down using a grinding tool near a trailing portion of the sole to change the bounce angle. Grinding the trailing portion of the sole can move the point where the sole contacts the ground toward the striking face of the golf club head, thereby decreasing the bounce angle and making the golf club head more suitable for firmer ground surfaces and/or for players with a shallower angle of attack in their swings.

However, grinding away or removing material from the sole reduces the mass of the golf club head and can change the distribution of mass in the golf club head. Such changes can cause a change in the location of a "sweet spot" for ideally striking a golf ball and/or the feel of the golf club when swinging the golf club due to a difference in weight and mass distribution. Removing material from the sole by grinding is also generally a permanent modification that cannot be adjusted later on by adding mass back to the sole.

SUMMARY

One aspect of the present disclosure includes a method of modifying a golf club head including a top portion, a striking face including a face center and being generally coplanar to a virtual striking face plane, and a sole including a leading edge and a trailing edge. The method includes engaging a bending tool with the golf club head, and bending at least a portion of the sole by applying a force using the bending tool to cause plastic deformation of the sole. The plastic deformation changes a contour of an exterior surface of the sole.

Changing the contour of the exterior surface of the sole can ordinarily adjust a bounce angle of the golf club head. The bounce angle can be defined as an angle between a virtual sole line and a virtual ground plane when the golf club head is orientated in a reference position. The bounce angle can be measured in a virtual vertical plane intersecting the virtual striking face plane and passing through the face center of the golf club head. The virtual sole line can be defined by a line passing through the leading edge and a ground contact point where the golf club head contacts the virtual ground plane when orientated in the reference position.

According to another aspect of the present disclosure, a golf club head includes a striking face with a face center and generally coplanar with a virtual striking face plane, a top portion, a sole including a leading edge and a trailing edge, and a rear side opposite the striking face. The rear side includes a channel configured to permit bending at least a portion of the sole to cause plastic deformation of the sole to change the bounce angle.

According to another aspect of the present disclosure, a bending tool for changing a bounce angle of a golf club head includes a clamp configured to secure or engage with the golf club head, and a press including a target profile for a sole of the golf club head. At least one actuator of the bending tool is configured to move the press toward the clamp. When the golf club head is secured by the clamp, the movement of the press toward the clamp bends the sole of the golf club head to the target profile of the press.

According to yet another aspect of the present disclosure, a bending tool for changing a bounce angle of a golf club head includes a clamp configured to secure or engage with the golf club head, and a flange configured to fit into a channel in a rear side of the golf club head opposite a striking face of the golf club head. A turning member of the bending tool is configured to move the flange about a pivot to cause a bending moment in the golf club head between a sole of the golf club head and the channel when the golf club head is secured or engaged with the clamp.

BRIEF DESCRIPTION OF DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 3A is a cross-section view of the golf club head of FIG. 2 taken along cross-section line 3 in FIG. 2.

FIG. 3B is a cross-section view of the golf club head of FIG. 3A after bending a portion of a sole of the golf club head to decrease a bounce angle according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
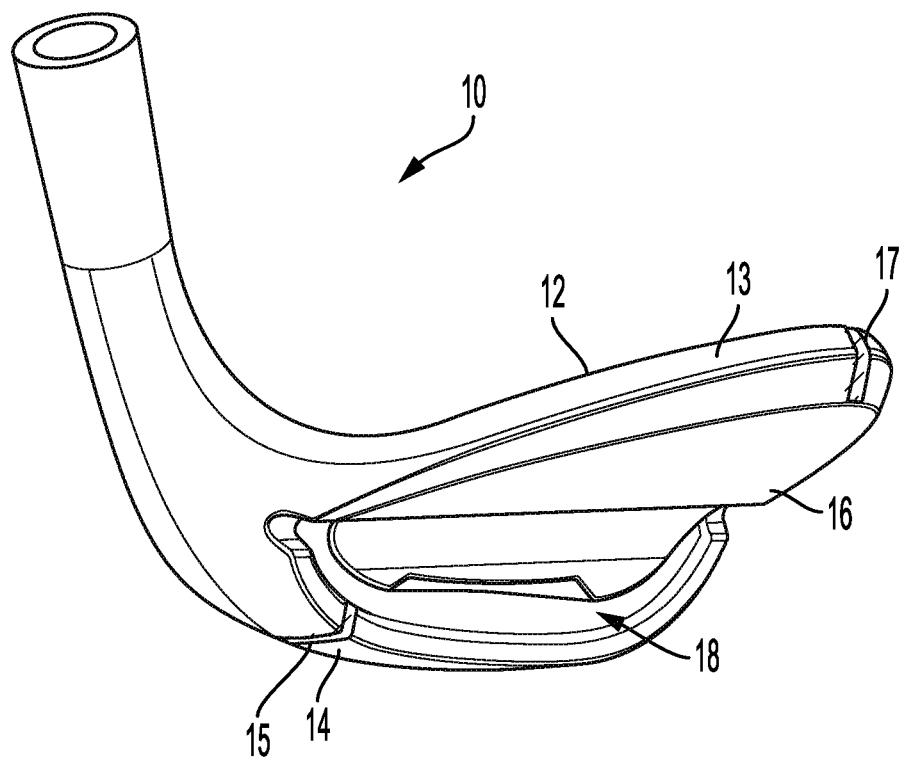
FIG. 1 is a rear perspective view of a golf club head according to an embodiment.

FIG. 1 is a rear perspective view of golf club head 10 according to an embodiment. As shown in FIG. 1, golf club head 10 includes striking face 12 configured to hit a golf ball, top portion 13 adjacent striking face 12, and rear side 16 opposite striking face 12. Rear side 16 includes channel 18 that is configured to facilitate or permit bending of at least a portion of sole 14 of golf club head 10 to change a contour of an exterior surface of sole 14. As discussed in more detail below, plastic deformation of sole 14 can change a bounce angle of golf club head 10, which can affect the amount of resistance the golf club head encounters from a ground surface (e.g., turf, sand, or soil) when swinging the golf club to hit a golf ball. The bounce angle can be especially important when the golf ball is hit from looser ground surfaces, such as from softer sand or tall grass, to allow golf club head 10 to move along or through such ground surfaces with less resistance. For example, when hitting a golf ball from a soft sand, a higher bounce angle may be desired so that a leading edge of sole 14 (e.g., leading edge 26 in FIG. 3A) does not dig into the sand, but rather, allows golf club head 10 to move through the sand.

The present disclosure provides example methods and golf club heads for changing a contour of an exterior surface of a sole to adjust a bounce angle of the golf club head. Such adjustments may be made, for example, to accommodate different ground surface conditions and/or different angles of attack used by different golfers in their swings (e.g., a steep angle of attack versus a shallow angle of attack). Unlike conventional methods of grinding a trailing edge portion of a sole to adjust a bounce angle, the bending of at least a portion of the sole as in the present disclosure, ordinarily allows for the bounce angle to be adjusted without removing mass from the golf club head. As noted above, removing mass from the golf club head can cause a change in a location of a "sweet spot" for ideally striking a golf ball and/or change the feel of a golf club including the golf club head when swinging the golf club due to the change in weight and mass distribution. In addition, unlike bending the sole, removing mass from the golf club head by grinding is generally a permanent modification that cannot be adjusted later on by adding mass back to the sole.

Figure 3C:
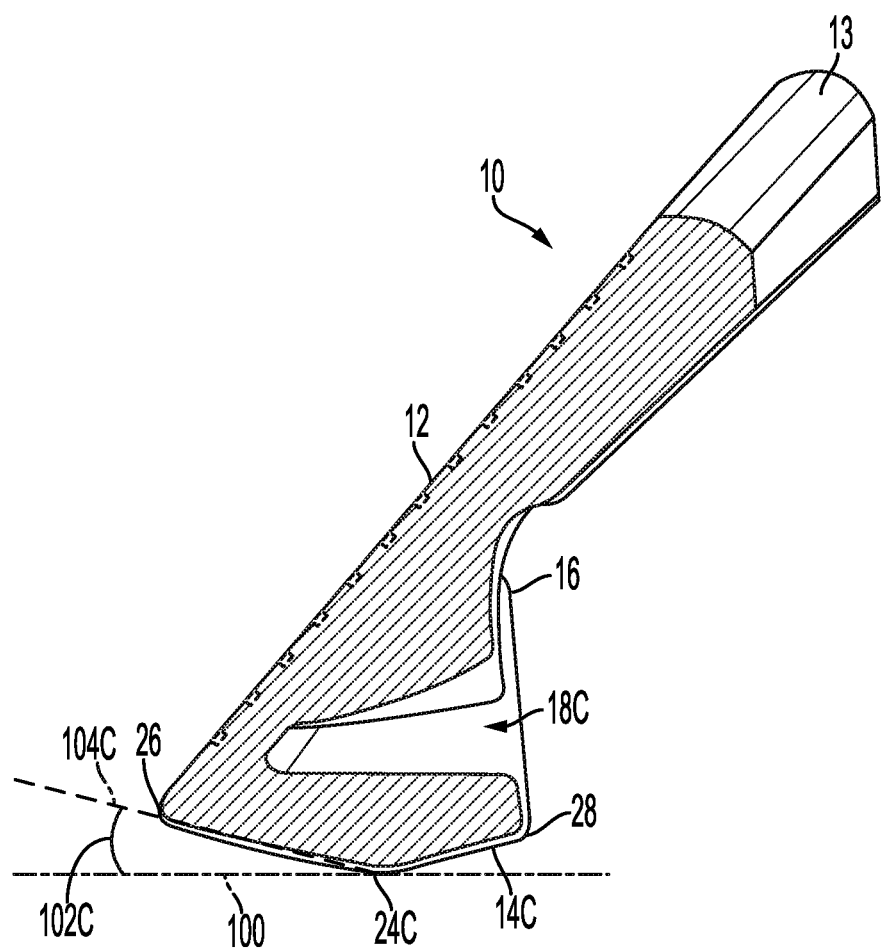
FIG. 3C is a cross-section view of the golf club head of FIG. 3A after bending a portion of the sole to increase a bounce angle according to an embodiment.
Figure 4:
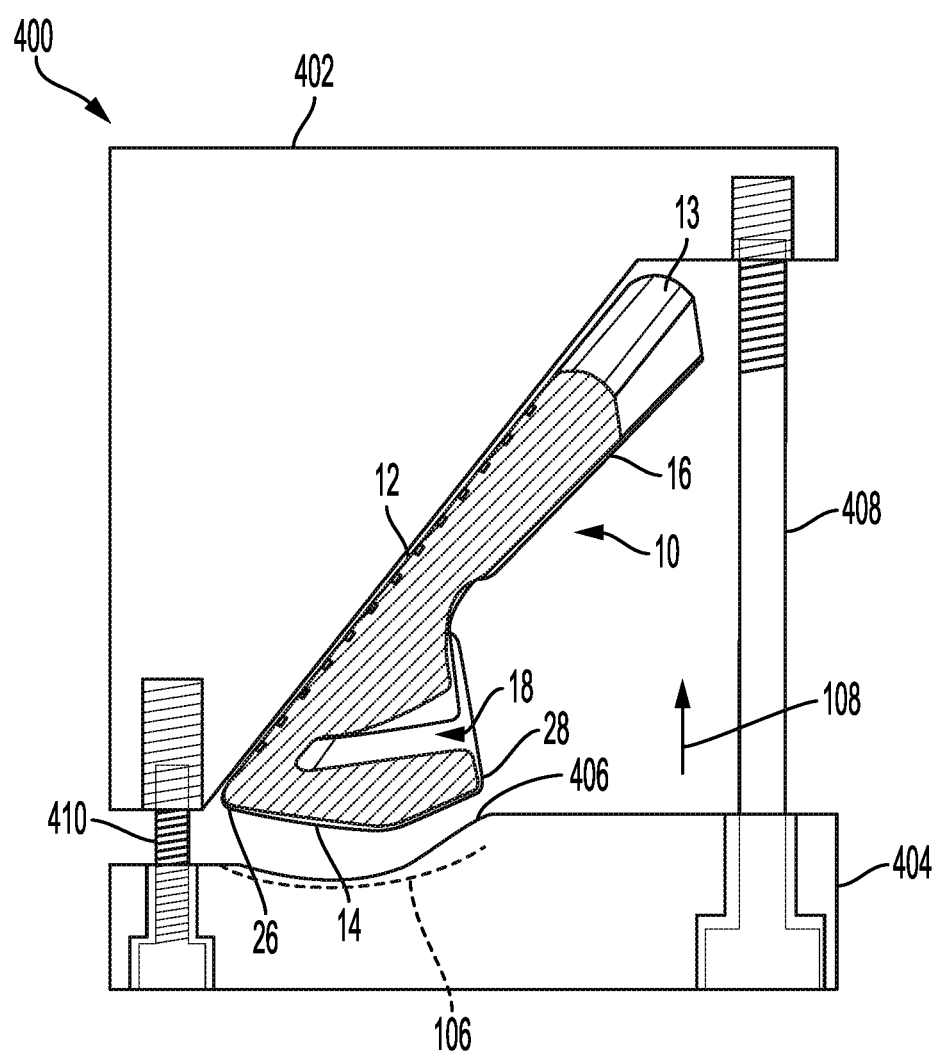
FIG. 4 illustrates the use of a bending tool including a press for changing a bounce angle of a golf club head according to an embodiment.
Figure 5:
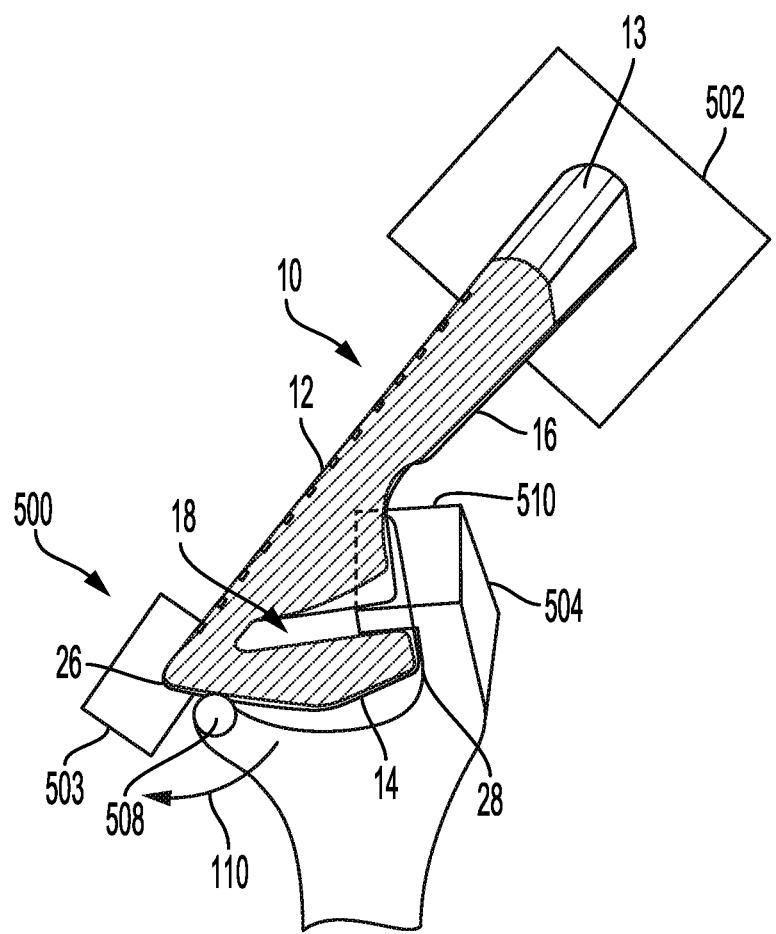
FIG. 5 illustrates the use of a bending tool including an actuated flange for changing a bounce angle of a golf club head according to an embodiment.

In the example of FIG. 1, golf club head 10 includes placement identifiers 15 and 17 for positioning golf club head 10 with respect to a bending tool (e.g., bending tool 400 in FIG. 4 and/or bending tool 500 in FIG. 5). As discussed in more detail below with respect to FIGS. 4 and 5, such bending tools may be used to change a contour of the exterior surface of sole 14, thereby changing the bounce angle by relocating a ground contact point of sole 14 (e.g., ground contact point 24 in FIG. 3A) along a width of sole 14 when golf club head 10 is orientated in a reference position where golf club head 10 is addressed to hit a golf ball.

Those of ordinary skill in the art will appreciate that other implementations of golf club 10 may include a different construction than shown in FIG. 1. For example, other implementations may not include an interior cutout in channel 18, as shown in FIG. 1. As another example, other implementations of golf club head 10 may not include one or both of placement identifiers 15 and 17.

Figure 2:
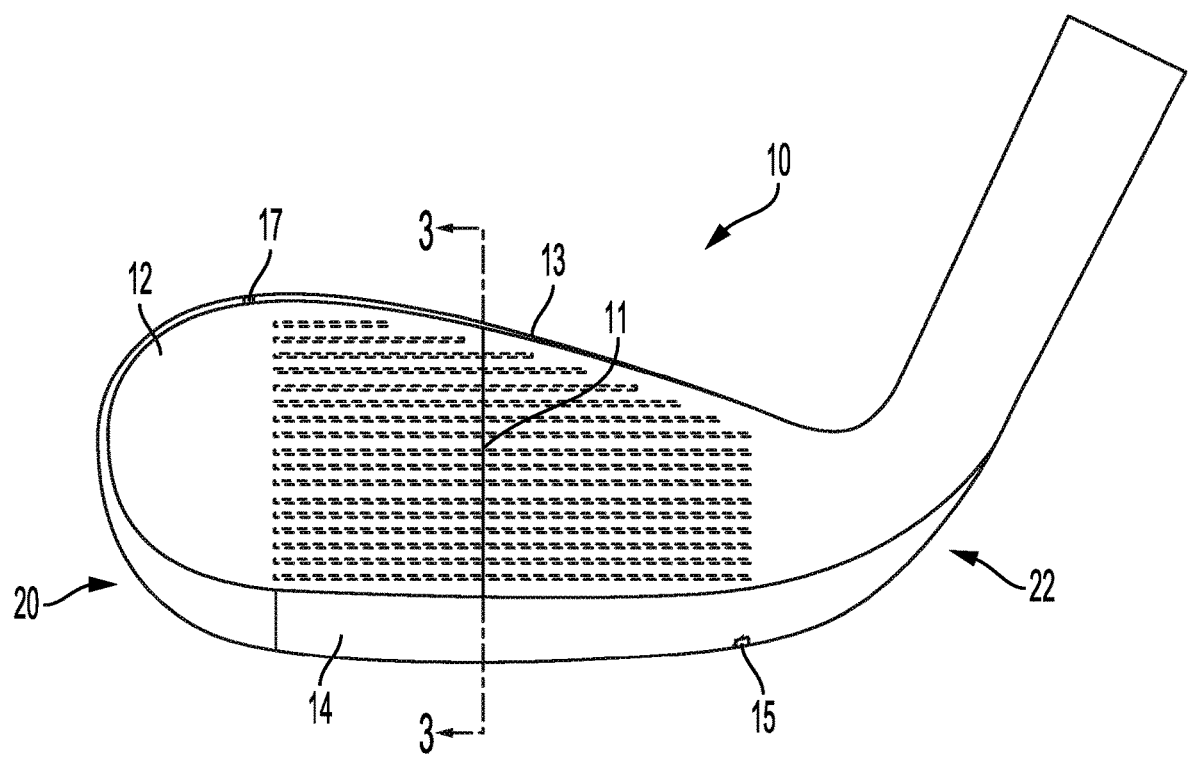
FIG. 2 is a front view of a golf club head according to an embodiment.

FIG. 2 is a front view of golf club head 10 according to an embodiment. As shown in FIG. 2, golf club head 10 includes toe portion 20 and heel portion 22. With reference to rear side 16 shown in FIG. 1, channel 18 extends entirely across golf club head 10 laterally from a heel-most extent of golf club head 10 at heel portion 22 to a toe-most extent of golf club head 10 at toe portion 20. This configuration assists in permitting plastic deformation of sole 14 of golf club head 10 in a manner that does not require undue force, can be adjusted precisely, and will not unintendedly vary and/or cause cracks or other failure.

Striking face 12 in FIG. 2 includes score lines shown in dashed lines. Striking face 12 further includes face center 11 located along cross-section line 3, which indicates a virtual vertical plane passing through face center 11. Face center 11 is centered laterally between a heel-wardmost extent and a toe-wardmost extent of the scorelines, and centered vertically between upper-most and lower-most extents of the scorelines. In the example of FIG. 2, a leading portion of sole 14 closer to striking face 12 is visible. In contrast, a trailing portion of sole 14 closer to rear side 16 is visible in FIG. 1. In this regard, in the examples of FIGS. 1 and 2, sole 14 includes a keel where a slope in a contour of sole 14 abruptly changes direction. In some implementations, the leading or front portion of sole 14 can include the portion of sole 14 from the keel to a leading edge (e.g., leading edge 26 in FIG. 3A), which may include a radius or rounded edge. The trailing or rear portion of sole 14 in some implementations can include the portion of sole 14 from the keel to a trailing edge (e.g., trailing edge 28 in FIG. 3A), which may also include a radius or rounded edge. The keel may extend from heel portion 22 to toe portion 20. In some implementations, channel 18 in rear side 16 can extend into golf club head 10 from rear side 16 at least as far as a location vertically aligned with the keel.

FIG. 3A is a cross-section view of golf club head 10 taken along cross-section line 3 in FIG. 2, which passes through face center 11 along a height of striking face 12. Striking face 12 is generally coplanar to virtual striking face plane 101. As shown in FIG. 3A, bounce angle 102 is the angle between virtual sole line 104 and virtual ground plane 100 when golf club head 10 is orientated in the reference position for striking a golf ball, which is also shown in FIG. 3A. Bounce angle 102 is measured in the virtual vertical plane passing through face center 11 along a height of striking face 12 and perpendicular to virtual striking face plane 101 of striking face 12 (i.e., a vertical plane along cross-section line 3 in FIG. 2). Virtual sole line 104 is defined by a line passing through leading edge 26 of sole 14 and ground contact point 24, which is located in the virtual vertical plane. Leading edge 26 can be where sole 14 connects to striking face 12, and may include a radius or curved edge.

In the example of FIG. 3A, a first distance D1 is greater than a second distance D2 to allow for bending or plastic deformation of at least a portion of sole 14 without affecting striking face 12. D1 is the least distance between leading edge 26 and a bottom internal surface of channel 18 measured in the virtual vertical plane. D2, on the other hand, is the least distance between trailing edge 28 and an opening of channel 18. In addition, a ratio of a depth of channel 18 (i.e., depth D3) to a linear width of sole 14 (i.e., W in FIG. 3A) as measured from leading edge 26 to trailing edge 28 is preferably greater than 0.60. This ratio can ordinarily allow for sufficient bending and plastic deformation of sole 14 to change a contour of the exterior surface of sole 14 for adjusting bounce angle 102, as discussed in more detail below with reference to FIGS. 3B and 3C. In another aspect, channel 18 preferably extends into golf club head 10 from rear side 16 at least 30% of linear width W to allow for sufficient bending and plastic deformation of sole 14 to change the contour of the exterior surface of sole 14 for adjusting bounce angle 102.

In addition, the width of channel 18 (i.e., CW in FIG. 3A) can preferably be between 0.0625 inches and 0.25 inches. This range of channel width can ordinarily allow enough room for compression and plastic deformation of sole 14 up toward top portion 13. In some implementations, the channel width can be sized to only allow for a certain amount of bending of a trailing portion of sole 14 before a bottom internal surface of channel 18 contacts a top internal surface of channel 18. This arrangement can ordinarily allow for the amount of bending to be limited to prevent bending sole 14 beyond a predetermined angle. Channel 18 may also be tapered so that it narrows from a widest channel width (i.e., between two opposing internal surfaces of channel 18) at an opening in rear side 16 towards a narrower channel width closer to striking face 12. This can provide for more structural integrity for portions of golf club head 10 that are closer to striking face 12 to help maintain the form of striking face 12 during bending of sole 14. In addition, and as discussed in more detail below with reference to FIGS. 5 and 8, the channel width may also be sized for compatibility or for fitting with a flange of a bending tool (e.g., flange 510 of bending tool 500 in FIG. 5).

Golf club head 10 or portions of golf club head 10, such as between sole 14 and an internal bottom surface of channel 18, can include one or more materials that affect how golf club head 10 reacts to the application of force and/or different loading patterns over time. For example, the portion of golf club head 10 between sole 14 and the internal bottom surface of channel 18 can include at least one of 8620 stainless steel, 1020 stainless steel, and 1025 stainless steel. The selection of a material for golf club head 10 or a portion thereof can be based on characteristics of the material such as, a yield strength of the material indicating a point on a stress-strain curve for the material where plastic deformation begins, a plasticity of the material (e.g., ductility for tensile loads and malleability for compressive loads) indicating an amount of plastic deformation the material can withstand before rupturing, the Young's modulus of the material indicating a stiffness of the material, and/or a Poisson ratio of the material indicating an amount of transversal expansion for an amount of axial compression.

FIG. 3B is a cross-section view of golf club head 10 after bending a trailing portion of sole 14 in FIG. 3A to change a contour of the exterior surface of sole 14 to the contour of the exterior surface of sole 14B shown in FIG. 3B. This change in the contour of the exterior surface of sole 14 results in a decrease in bounce angle 102 in FIG. 3A to bounce angle 102B in FIG. 3B between virtual sole line 104B and virtual ground plane 100. As shown in FIG. 3B, the plastic deformation of a trailing edge portion of sole 14 has relocated ground contact point 24 in FIG. 3A to the location along ground plane 100 shown at ground contact point 24B in FIG. 3B, which is closer to leading edge 26 than in FIG. 3A. In this regard, the linear width W of sole 14 has been decreased by the upward bending of the trailing portion of sole 14.

In addition, the width of channel 18 in FIG. 3A, CW, has narrowed as shown by channel 18B in FIG. 3B due to the bending of sole 14. As noted above, the width of channel 18 can limit the amount of bending or plastic deformation of sole 14 when compressing sole 14, and thereby limit how much bounce angle 102 can be decreased to prevent bending past a predetermined angle.

Channel 18 can facilitate bending the trailing portion or another predetermined portion of sole 14 by weakening the structural integrity of the predetermined portion of sole 14 in response to a bending moment, as compared to other portions of golf club head 10 that are at a greater distance from an internal surface of channel 18. For example, leading edge 26 in FIG. 3A is at a greater distance of D1 than trailing edge 28 at distance D2. A bending moment applied on the beam-like structure formed between a bottom internal surface of channel 18 and sole 14 will ordinarily result in more bending at trailing edge 28 than at leading edge 26. The location of channel 18 in golf club head 10 can therefore localize or help isolate the bending and plastic deformation in sole 14.

FIG. 3C is a cross-section view of golf club head 10 of FIG. 3A after bending a trailing portion of sole 14 to change the contour of the exterior surface of sole 14 to the contour of the exterior surface of sole 14C shown in FIG. 3C. In contrast to the example shown in FIG. 3B, the change to the contour of the exterior surface of sole 14 in FIG. 3C results in increasing bounce angle 102 to bounce angle 102C between virtual sole line 104C and virtual ground plane 100. As shown in FIG. 3C, the plastic deformation of a trailing portion of sole 14 has relocated ground contact point 24 in FIG. 3A to the location along ground plane 100 shown at ground contact point 24C in FIG. 3C, which is farther from leading edge 26 than in FIG. 3A. The linear width W of sole 14 has been increased by the downward bending of the trailing portion of sole 14. In addition, the width of channel 18C in FIG. 3A has widened by the bending of sole 14C in FIG. 3C.

FIG. 4 illustrates the use of bending tool 400 including press 404 for changing a bounce angle of golf club head 10 according to an embodiment. As shown in the example of FIG. 4, press 404 includes target profile 406, which differs from the original profile or contour of sole 14 shown in FIG. 4 with dashed line 106.

Golf club head 10 is secured in bending tool 400 using clamp 402. In some implementations, golf club head 10 may be secured against clamp 402 using a strap or other form of attachment. In other implementations, clamp 402 may include a portion surrounding top portion 13 and contacting an upper portion of rear side 16 and/or at least a portion of channel 18. The material used for clamp 402 and press 404 may be selected so as to provide a greater strength and stiffness than the material of golf club head 10.

In operation, golf club head 10 is compressed in the direction shown by arrow 108 by actuating press 404 using threaded bolts 408 and 410. In some implementations, press 404 is moved by manual actuation, such as by turning a handle of bending tool 400 that turns bolts 408 and 410. In other implementations, press 404 is moved by other forms of actuation, such as by a hydraulic actuator or electric motor that turns bolts 408 and 410.

The compression of sole 14 of golf club head 10 by press 404 bends or plastically deforms at least a portion of sole 14 into target profile or contour 406, while maintaining the same form for striking face 12. The compression of sole 14 can decrease the bounce angle as discussed above with reference to FIG. 3B by relocating ground contact point 24 closer to leading edge 26 and effectively shortening the linear width of sole 14. In some implementations, press 404 may be interchangeable with other presses that each include a different target profile for sole 14. A press may be selected from a plurality of different presses to obtain a particular bounce angle for golf club head 10.

Those of ordinary skill in the art will appreciate that other implementations may include a different arrangement for bending tool 400. For example, other implementations of bending tool 400 can have the press above the clamp such that golf club head 10 is secured into bending tool 400 upside down. As another example, clamp 402 may have a different construction for securing top portion 13 and striking face 12 of golf club head 10. In other examples, press 402 may be actuated differently than as shown in FIG. 4, such as with a hydraulic piston that presses down on clamp 402, without threading on bolts 408 and 410.

In this regard, FIG. 5 illustrates the use of a different bending tool 500 including flange 510 for bending sole 14 of golf club head 10 according to an embodiment. As shown in FIG. 5, golf club head 10 is secured in bending tool 500 with clamp 503 at a portion of golf club head 10 around leading edge 26 where sole 14 and striking face 12 meet, and with clamp 502 around top portion 13 of golf club head 10. In some implementations, clamp 502 can include opposing sides that are tightened onto the upper portions of striking face 12 and rear side 16. Clamp 503 may be tightened in a similar manner on leading edge portions of striking face 12 and sole 14.

Flange 510 of bending tool 500 is inserted into channel 18 of golf club head 10. In some implementations, flange 510 can be tapered or have a specific shape for fitting into channel 18 and contacting internal walls of channel 18. In addition, flange 510 may or may not extend into the full depth of channel 18. The material used for flange 510 and for clamps 502 and 504 may be selected so as to provide a greater strength and/or stiffness than the material of golf club head 10.

In operation, turning member 504 of bending tool 500 is rotationally actuated or turned about pivot 508 in direction 110 to apply a torque to golf club head 10 by flange 510. Pivot 508 can include, for example, a pin with ball bearings. In some implementations, turning member 504 including flange 510 is rotated or turned by manual actuation, such as by moving a handle of bending tool 500 that moves turning member 504 and flange 510 about pivot 508. In other implementations, turning member 504 and flange 510 are moved by another type of actuation, such as by an electric motor that turns turning member 504.

The applied torque causes a bending moment to bend at least a portion of sole 14 causing plastic deformation of sole 14, while maintaining the same form for striking face 12. In more detail, the downward pulling caused by flange 510 rotating in direction 110 widens channel 18 and lowers the trailing edge portion of sole 14 to change the contour of the exterior surface of sole 14. Such lowering of the trailing portion of sole 14 can increase the bounce angle of golf club head 10 as discussed above with reference to FIG. 3C by relocating ground contact point 24 farther from leading edge 26 toward trailing edge 28, and effectively increasing the linear width of sole 14. In some implementations, the amount of rotation can be set to achieve a particular bounce angle. In addition, bending tools 400 and 500 may be used at different times on the same golf club head to either increase or decrease the bounce angle of the golf club head for different ground surface conditions and/or for changes in a player's swing over time.

Those of ordinary skill in the art will appreciate that other implementations may include a different arrangement for bending tool 500. For example, other implementations of bending tool 500 may have a different construction for securing top portion 13 and striking face 12 of golf club head 10, or may have a different orientation (e.g., upside down) than shown in FIG. 4.

Figure 6:
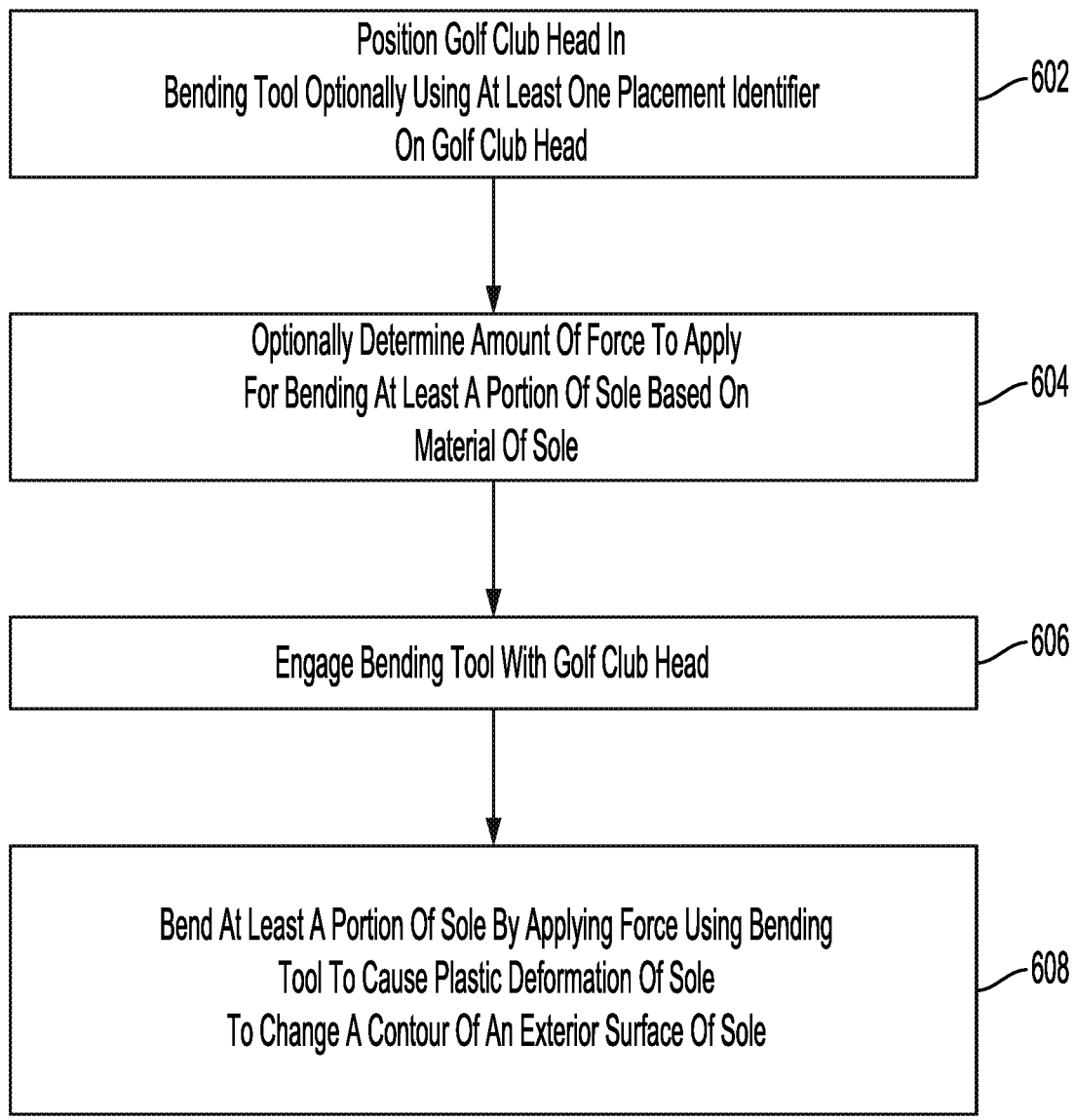
FIG. 6 is a flowchart for modifying a golf club head to change a contour of an exterior surface of a sole of the golf club head according to an embodiment.

FIG. 6 is a flowchart for modifying a golf club head to change a contour of an exterior surface of the sole of the golf club head according to an embodiment. The process of FIG. 6 may be performed, for example, by using bending tool 400 of FIG. 4, bending tool 500 of FIG. 5, or a different bending tool. In some cases, the modification of a golf club head in the process of FIG. 6 may be performed following a fitting for a golf club where a golfer's swing may be evaluated, in response to particular ground conditions to be played, or as part of an initial manufacturing process for a golf club. In this regard, the process of FIG. 6 may or may not be repeated at different times for the same golf club head.

In block 602, golf club head 10 is positioned in the bending tool. In some implementations, golf club head 10 can be positioned in the bending tool using at least one placement identifier on golf club head 10, such as with placement identifiers 15 or 17 shown in FIGS. 1 and 2. Such placement identifiers can be used to align golf club head 10 with different components or markings of the bending tool, such as markings on clamp 402 or press 404 in FIG. 4 or markings on clamp 502, clamp 503, or flange 510 in FIG. 5.

In block 604, an amount of force to apply is optionally determined for bending at least a portion of sole 14 based on a material of sole 14. As noted above, materials can have different characteristics that can affect how the golf club head reacts to the application of different amounts of force and/or different loading patterns over time. Such characteristics can include, for example, a yield strength of the material, a plasticity of the material (e.g., ductility for tensile loads and malleability for compressive loads), the Young's modulus of the material, and/or a Poisson ratio of the material.

As discussed above, sole 14 can include materials such as, for example, at least one of 8620 stainless steel, 1020 stainless steel, and 1025 stainless steel. Such materials can allow for enough plastic deformation of sole 14 to provide a relatively wide range of different bounce angles, such as from 4 degrees to 16 degrees. A lower amount of force may be determined or selected in block 604 for a more ductile material or for a material that has a lower yield strength, as compared to another material that may be stiffer or have a higher yield strength.

In block 606, the bending tool is engaged with golf club head 10 to secure golf club head 10 in the bending tool. This can include closing or attaching one or more clamps onto a portion of golf club head 10. In the example of bending tool 400 of FIG. 4, this can include attaching clamp 402 to golf club head 10. In the example of bending tool 500 in FIG. 5, this can include attaching clamps 502 and 503 onto golf club head 10, and inserting flange 510 into channel 18.

In block 608, at least a portion of sole 14 is bent by applying force using the bending tool to cause plastic deformation of sole 14 to change a contour of an exterior surface of sole 14. As discussed above with reference to FIGS. 3B and 4, this can include bending or compressing a trailing portion of sole 14, such as by bending the contour of the exterior surface of sole 14 to a target profile or contour. In the example of FIGS. 3C and 5, the bending of sole 14 in block 608 can include bending or applying a torque to a trailing portion of sole 14, such as by bending sole 14 by rotating flange 510 of bending tool 500 in FIG. 5 to pull at least a portion of sole 14 out from channel 18 to increase the linear width of sole 14 and move ground contact point 24 toward trailing edge 28 when golf club head 10 is orientated in the reference position.

Figure 7:
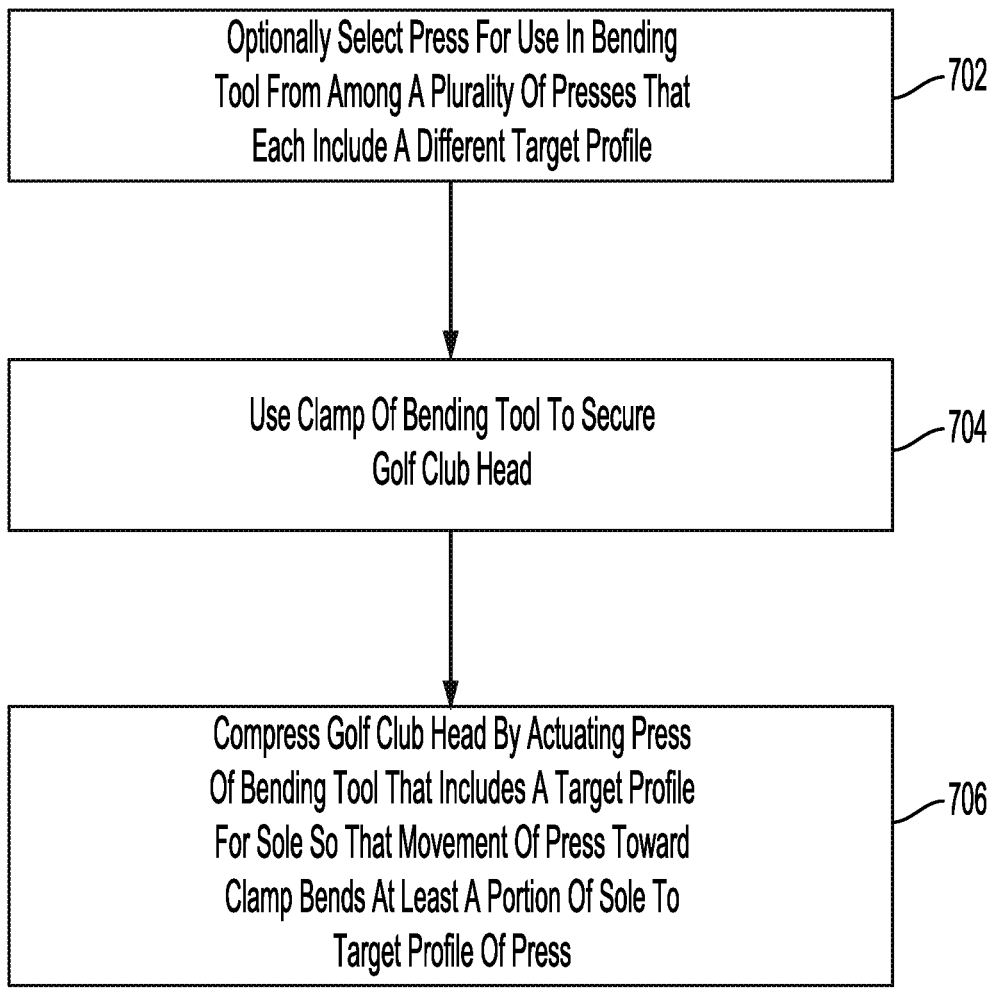
FIG. 7 is a flowchart for using a bending tool including a press to bend at least a portion of a sole of a golf club head to a target profile according to an embodiment.

FIG. 7 is a flowchart for using a bending tool including a press to bend at least a portion of a sole of a golf club head to a target profile according to an embodiment. The bending tool can include, for example, bending tool 400 of FIG. 4 with press 404 including target profile 406. As with the example modification process of FIG. 6 discussed above, the process of FIG. 7 may be performed following a fitting for a golf club where a player's swing may be evaluated, in response to particular ground surface conditions to be played, or as part of an initial manufacturing process for a golf club. In this regard, the process of FIG. 7 may or may not be repeated at different times for the same golf club head.

In block 702, a press is optionally selected for use in the bending tool from among a plurality of presses that each include a different target profile or desired contour for an exterior surface of sole 14 of golf club head 10. The different target profiles can provide different bounce angles by controlling the amount of plastic deformation or bending of sole 14. For example, each press may indicate a different bounce angle based on the target profile of the press. A press may then be selected for use in the bending tool to achieve a particular bounce angle.

In block 704, a clamp of the bending tool is used to secure golf club head 10. This can include closing or attaching one or more clamps onto a portion of golf club head 10. In the example of bending tool 400 of FIG. 4, this can include attaching clamp 402 to golf club head 10. The use of the clamp may also be located in a position on golf club head 10 to prevent any changes or deformation of striking face 12. In some implementations, golf club head 10 may be positioned in the bending tool before securing golf club head 10 using one or more placement identifiers on golf club head 10 (e.g., placement identifiers 15 and 17 in FIGS. 1 and 2).

In block 706, golf club head 10 is compressed by actuating the press of the bending tool including the target profile for sole 14. Movement of the press toward the clamp bends at least a portion of sole 14 to the target profile of the press. The actuation of the press may be done through manual actuation, such as by turning a handle of the bending tool, or may be performed by another form of actuation, such as with a hydraulic actuator or electric motor. The resulting plastic deformation of sole 14 can provide for a lower bounce angle due to the bending of a trailing portion of sole 14 into at least part of the space provided by channel 18. As discussed above, such compression shortens the linear width of sole 14 and moves ground contact point 24 closer to leading edge 26 when golf club head 10 is orientated in the reference position for striking a golf ball.

Figure 8:
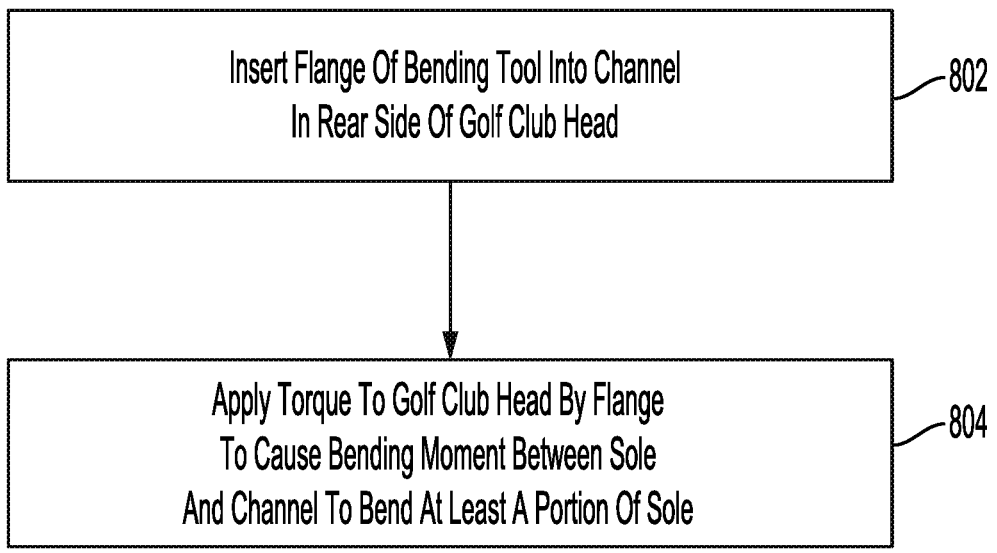
FIG. 8 is a flowchart for using a bending tool including an actuated flange to bend at least a portion of a sole of a golf club head according to an embodiment.

FIG. 8 is a flowchart for using a bending tool including an actuated flange to bend at least a portion of a sole of a golf club head according to an embodiment. The bending tool can include, for example, bending tool 500 of FIG. 5 with actuated flange 510. As with the example processes of FIGS. 6 and 7 discussed above, the process of FIG. 8 may be performed following a fitting for a golf club where a player's swing may be evaluated, in response to particular turf or soil conditions to be played, or as part of an initial manufacturing process for a golf club. In this regard, the process of FIG. 8 may or may not be repeated at different times for the same golf club head.

In block 802, a flange of the bending tool is inserted into channel 18 in rear side 16 of golf club head 10. The flange may or may not extend into the full depth of channel 18. In some implementations, the flange may be tapered or have a specific shape to fit into channel 18 or to contact internal surfaces of channel 18.

In block 804, a torque is applied to golf club head 10 by the flange to cause a bending moment between sole 14 and channel 18 to bend at least a portion of sole 14. The flange may be rotated or turned manually, such as by turning a handle of the bending tool, or may be performed by other forms of actuation, such as with an electric motor. The resulting plastic deformation of sole 14 can provide for a higher bounce angle due to the bending of a trailing portion of sole 14 to pull the trailing portion of sole 14 out from channel 18, thereby widening channel 18. As discussed above with reference to FIG. 3C, such bending increases the linear width of sole 14 and moves ground contact point 24 farther from leading edge 26 when golf club head 10 is orientated in the reference position for striking a golf ball.

The foregoing construction for a golf club head including a channel in its rear surface, and the modification processes of the present disclosure can allow for changing the bounce angle of a golf club head to better suit a particular swing (e.g., a steeper angle of attack versus a shallower angle of attack) and/or a particular ground surface condition (e.g., loose sand versus compacted sand), without grinding the sole of the golf club head, which may adversely affect a mass distribution or weight of the golf club head. As noted above, the foregoing modifications may also be performed at different points throughout the life of the golf club head, thereby reducing the number of golf clubs a player may have to purchase to accommodate different playing conditions or changes in the player's swing over time.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. For example, some alternative embodiments may include different types of bending tools than those shown in the present application to bend the sole of a golf club head. Accordingly, the described embodiments are to be considered in all respects only as illustrative and not restrictive, and the scope of the disclosure is, therefore, indicated by the following claims rather than by the foregoing description. All changes which come within the meaning and range of equivalency of the claims are to be embraced within their scope. In addition, the use of language in the form of "at least one of A and B" in the following claims should be understood to mean "only A, only B, or both A and B."

What is claimed is:

1. A golf club head, comprising:
   a striking face including a face center and generally coplanar with a virtual striking face plane;
   a top portion;
   a sole including a leading edge and a trailing edge; and a rear side opposite the striking face and including a channel configured to permit bending at least a portion of the sole to cause plastic deformation of the sole to change a contour of an exterior surface of the sole by moving a ground contact point closer to or farther from the leading edge to change a bounce angle of the golf club head, wherein the bounce angle is defined as an angle between a virtual sole line and a virtual ground plane when the golf club head is orientated in a reference position where the golf club head is addressed to hit a golf ball, the bounce angle measured in a virtual vertical plane perpendicular to the virtual striking face plane along a height of the striking face and passing through the face center, and the virtual sole line defined by a line passing through the leading edge and the ground contact point in the virtual vertical plane, and wherein a ratio of a depth of the channel to a width of the sole measured from the leading edge to the trailing edge is greater than 0.60 to facilitate the bending of the at least a portion of the sole.

2. The golf club head of claim 1, wherein a first distance D1 being a least distance between the leading edge of the sole and a bottom internal surface of the channel, measured in the virtual vertical plane, is greater than a second distance D2 being a least distance between the trailing edge and an opening of the channel on the rear side.

3. The golf club head of claim 1, wherein the ratio of the depth of the channel to the width of the sole measured from the leading edge to the trailing edge is greater than 0.65.

4. The golf club head of claim 1, wherein a width of the channel measured between an interior bottom surface and an interior top surface of the channel is between 0.0625 inch and 0.25 inch and is configured to prevent bending of the sole beyond a predetermined angle.

5. The golf club head of claim 1, further comprising at least one placement identifier for positioning the golf club head with respect to a bending tool used to cause the plastic deformation of the sole.

6. The golf club head of claim 1, wherein the sole includes a keel where a slope in a contour of the sole abruptly changes direction, the keel extending from a heel portion of the golf club head to a toe portion of the golf club head, and wherein the channel extends into the golf club head from the rear side at least as far as a location vertically aligned with the keel.

7. The golf club head of claim 1, wherein the sole includes at least one of 8620 stainless steel, 1020 stainless steel, and 1025 stainless steel.

8. The golf club head of claim 1, wherein the channel extends across the golf club head entirely from a heel-most extent of the golf club head to a toe-most extent of the golf club head.

9. The golf club head of claim 1, wherein the channel is tapered so that it narrows from a widest channel width between two opposing internal surfaces of the channel at an opening in the rear side towards a narrower channel width closer to the striking face.

10. The golf club head of claim 1, wherein a portion of the golf club head between the sole and an internal bottom surface of the channel includes a different material than another portion of the golf club head to affect the bending of the at least a portion of the sole.

11. A golf club head, comprising:
a striking face including a face center and generally coplanar with a virtual striking face plane;
a top portion;
a sole including a leading edge and a trailing edge; and
a rear side opposite the striking face and including a channel configured to permit bending at least a portion of the sole to cause plastic deformation of the sole to change a contour of an exterior surface of the sole by moving a ground contact point closer to or farther from the leading edge to change a bounce angle of the golf club head, wherein the bounce angle is defined as an angle between a virtual sole line and a virtual ground plane when the golf club head is orientated in a reference position where the golf club head is addressed to hit a golf ball, the bounce angle measured in a virtual vertical plane perpendicular to the virtual striking face plane along a height of the striking face and passing through the face center, and the virtual sole line defined by a line passing through the leading edge and the ground contact point in the virtual vertical plane; and
wherein a portion of the golf club head between the sole and an internal bottom surface of the channel includes a different material than a remaining portion of the golf club head to affect the bending of the at least a portion of the sole, and wherein the different material is limited to the portion of the golf club head between the sole and the internal bottom of the channel.

12. The golf club head of claim 11, wherein a ratio of a depth of the channel to a width of the sole measured from the leading edge to the trailing edge is greater than 0.60 to facilitate the bending of the at least a portion of the sole.

13. The golf club head of claim 11, wherein the ratio of the depth of the channel to the width of the sole measured from the leading edge to the trailing edge is greater than 0.65.

14. The golf club head of claim 11, wherein a width of the channel measured between an interior bottom surface and an interior top surface of the channel is between 0.0625 inch and 0.25 inch and is configured to prevent bending of the sole beyond a predetermined angle.

15. The golf club head of claim 11, further comprising at least one placement identifier for positioning the golf club head with respect to a bending tool used to cause the plastic deformation of the sole.

\* \* \* \* \*